Figure 1:
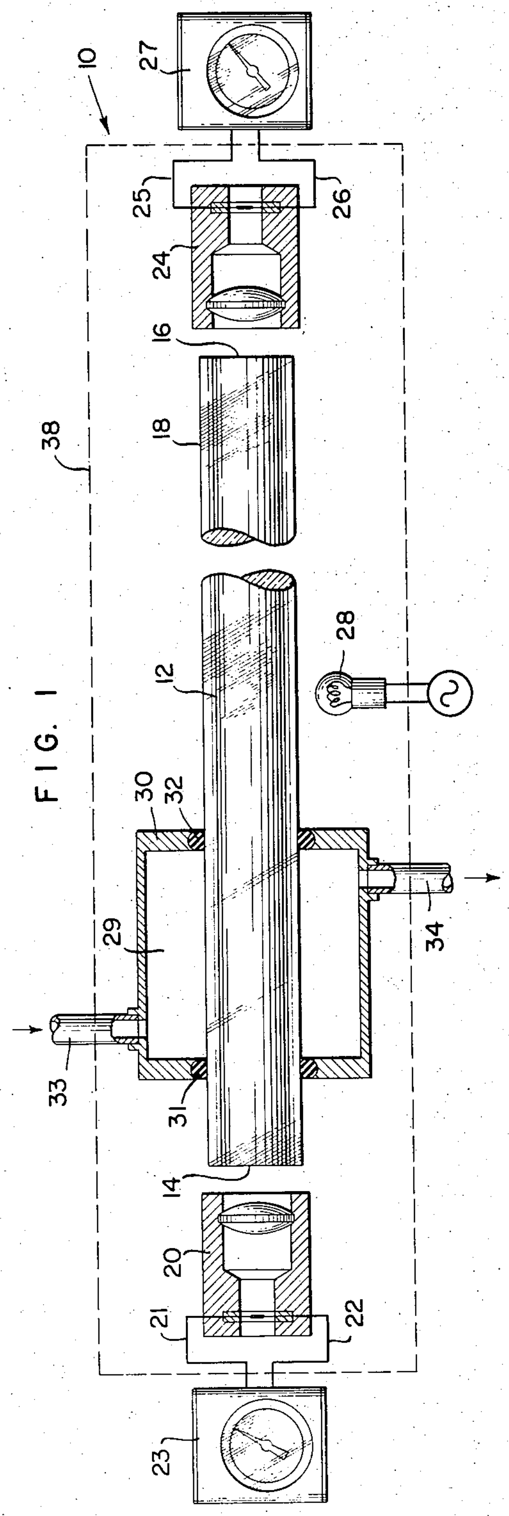

Dec. 20, 1960 W. WITT 2,964,993

ANALYZING APPARATUS

Filed Aug. 6, 1958 2 Sheets-Sheet 1

INVENTOR.
WALTER WITT

BY Arthur H. Swenson

ATTORNEY.

Dec. 20, 1960 W. WITT 2,964,993

ANALYZING APPARATUS

Filed Aug. 6, 1958 2 Sheets-Sheet 2

INVENTOR.
WALTER WITT

BY Arthur H. Swanson

ATTORNEY.

United States Patent Office 2,964,993
Patented Dec. 20, 1960

2,964,993

ANALYZING APPARATUS

Walter Witt, Philadelphia, Pa., assignor to Minneapolis-Honeywell Regulator Company, Minneapolis, Minn., a corporation of Delaware Filed Aug. 6, 1958, Ser. No. 753,571
4 Claims. (Cl. 88—14)

This invention relates to apparatus for analyzing fluids, and particularly relates to apparatus for analyzing fluids by means of measuring the index of refraction of the fluids being analyzed.

Another object of the present invention is the provision of a new and improved apparatus for analyzing fluids by measuring hte specific gravity and/or composition of the fluids to be analyzed.

In a copending United States patent application, Serial No. 753,570, filed by James Vollmer, et al. on Measuring Apparatus, and assigned to the assignee hereof, apparatus for analyzing fluids by measuring their indexes of refraction is disclosed. This apparatus was based on the discovery that if light were passed through a radiant energy guide, a predetermined amount of light would exit from that guide for a given index of refraction of the medium surrounding said guide. If the index of refraction of the surrounding medium were changed, a different amount of light would exit from the end of the guide. Accordingly, if in an instance in which two substantially identical guides were provided so as to receive in corresponding ends thereof a given amount of radiant energy such as light, and if one of the guides were surrounded by a jacket for containing a fluid to be analyzed, then the amount of light passing out of the last mentioned guide could be compared with the amount of light passing out of the other guide to give an indication of the color or chemical composition of the fluid passing through the surrounding jacket.

While the above mentioned Vollmer et al. apparatus provides a simple convenient way of analyzing fluids, the present apparatus contains several very desirable features which are not present in the Vollmer et al. apparatus. For instance, in one embodiment of the Vollmer et al. apparatus it is desirable to employ two radiant energy guides. In the present apparatus, as will be described hereinafter, only one radiant energy guide is employed for this same purpose.

Another object of the present invention is to provide a new and simplified apparatus for analyzing fluids.

Another object of the present invention is the provision of a new and improved apparatus for analyzing fluids by measuring the change in specific gravity of said fluids wherein a radiant energy guide is employed and radiant energy is transmitted into said guide along the peripheral side wall thereof.

Another object of the present invention is the provision of an improved analyzing apparatus for automatically measuring specific gravity and/or composition of a fluid which apparatus relies on the changes in the conductivity of light passing through a radiant energy guide such as, for instance, an artificial sapphire rod, as a consequence of changes in the absorption characteristics and index of refraction.

Figure 2:
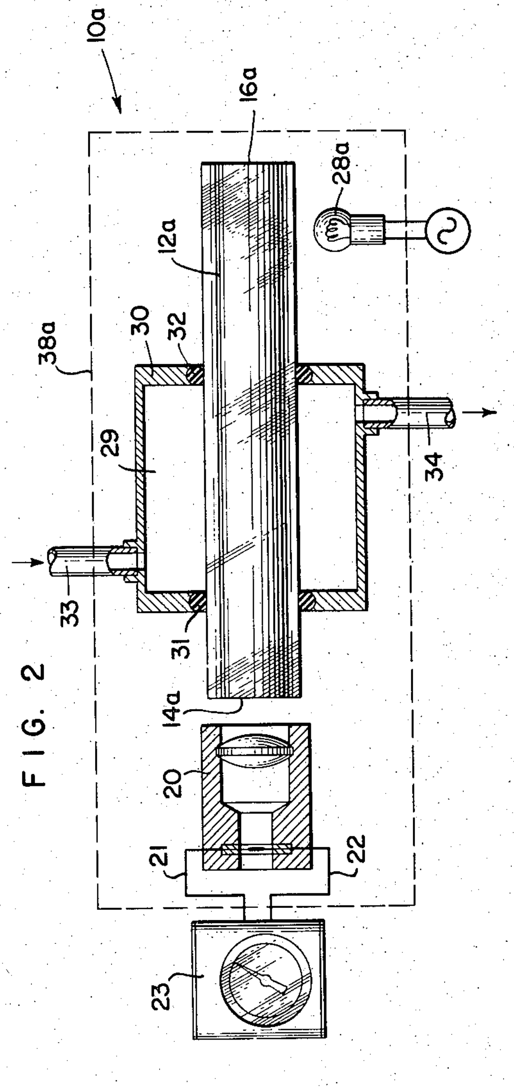
Figure 4:
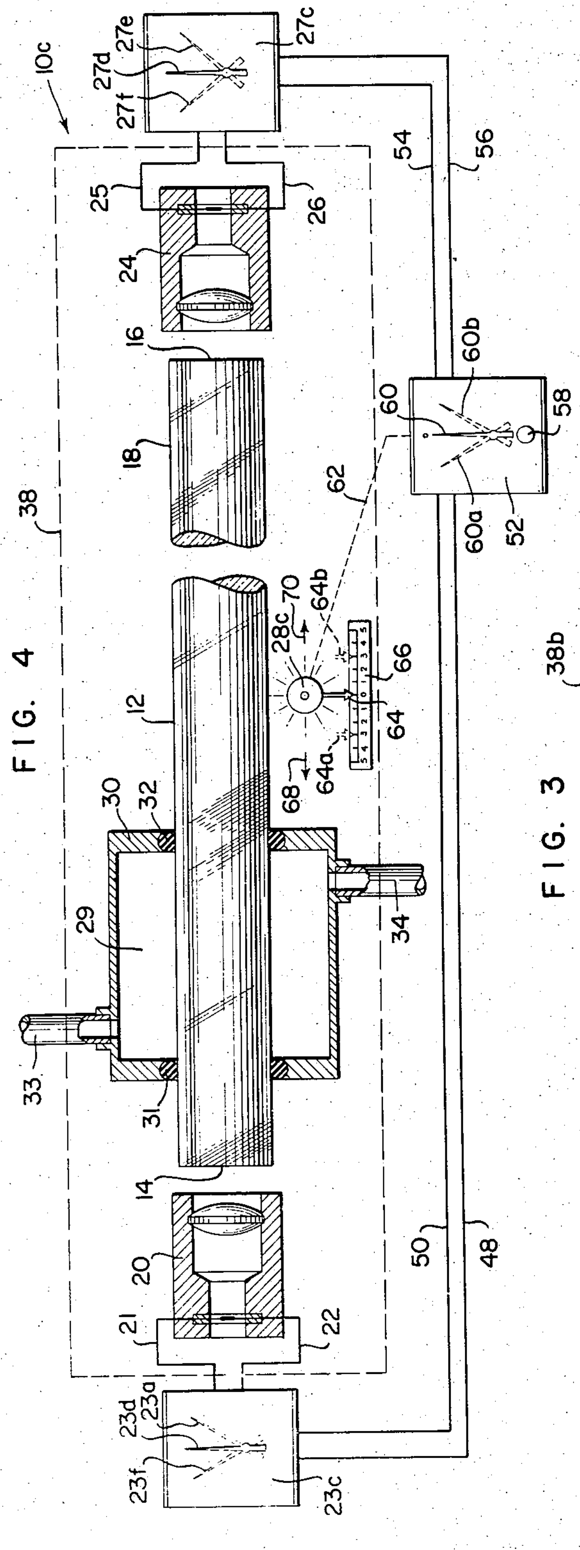
Figure 3:
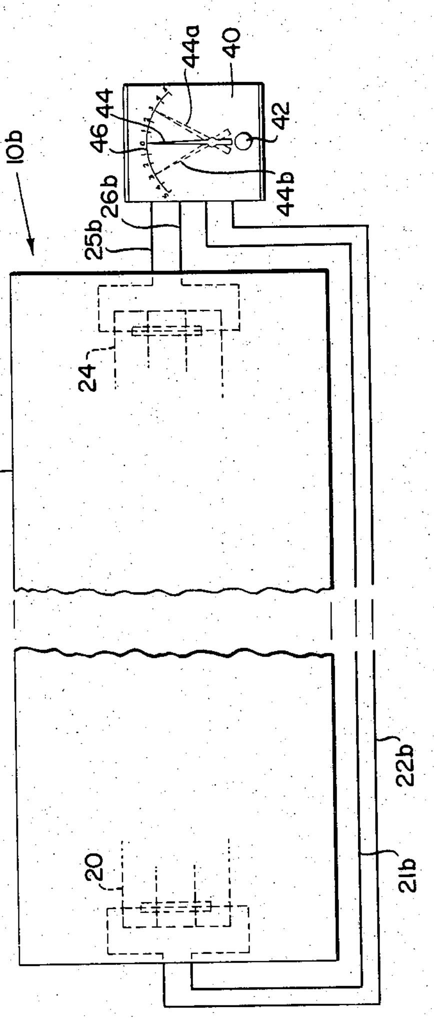

In the drawing:

Fig. 1 discloses one embodiment of the present invention;

Fig. 2 shows another embodiment of the invention similar to that shown in Fig. 1 but with a light detecting apparatus at the right end of Fig. 1 removed;

Fig. 3 shows still another embodiment of the invention similar to that shown in Fig. 1 but wherein the conductors which lead away from the thermopiles are each connected to a null balanced indicator, and Fig. 4 shows still another embodiment of the invention similar to that shown in Fig. 1 but wherein the conductors leading away from the detectors are connected to a null indicating instrument and the radiant energy source is displaced longitudinally along an indicating scale.

Fig. 1 of the drawing shows a fluid analyzing apparatus which is generally designated as reference numeral 10. This apparatus comprises a longitudinally extending radiant energy guide 12 which is of a transparent radiant energy transmitting material such as, for instance, sapphire, quartz or pyrex. As shown herein, guide 12 is in the form of a rod having ends 14 and 16 and a peripheral side wall 18.

Disposed so as to receive radiant energy exiting from end 14 is a radiant energy responsive means such as a thermopile 20 whose output voltage is connected by way of conductors 21, 22 to a meter 23 that is used to measure the magnitude of this output voltage. Disposed to receive radiant energy exiting from end 16 is a radiant energy responsive means such as a thermopile 24 whose output voltage is connected by way of conductors 25, 26 to a meter 27 that is used to measure the magnitude of this output voltage. Equidistant from ends 14 and 16 is a radiant energy emitter which may be any radiant energy source such as the bulb 28 which is so disposed as to direct light or other radiant energy e.g. energy in the infrared region at the peripheral side wall 18 of guide 12. I have discovered that regardless of how smooth peripheral side wall 18 is, there are always sufficient surface irregularities to provide a multitude of facets so arranged as to permit light or other radiant energy emitted from source 28 to pass into guide 12. Moreover, the rays of light so entering impinge upon the peripheral surface at angles of incidence slightly greater than the critical angle of the light guide and surrounding medium. For reasons which will become clear hereinafter, a substantial portion of the light that is directed towards the end 14 will not reach this end but will pass out of the guide and will be absorbed by the surrounding medium in chamber 29.

Surrounding a portion of peripheral side wall 18 between the center point of guide 12 and end 14 thereof is a stationary fluid containing jacket 30 which is of a light opaque material and whose walls are separated from the guide by means of O-rings 31, 32 and which has an inlet 33 and an outlet 34. Jacket 30 thus defines a fluid containing chamber 29 which is adapted to contain fluid in surface-to-surface relation with the peripheral side wall 18 of the guide 12.

The higher the index of refraction of the fluid in the chamber 29, the greater will be the critical angle of total reflection and the more light will pass out of the guide 12 and into the fluid medium that is within the chamber 29. Since the specific gravity of the fluid in chamber 29 may vary with any of a number of fluid variables such as, for instance, chemical composition or color, these variables can be accurately measured by comparing the amount of light exiting from end 14 of guide 12 with the amount of light exiting from end 16 of guide 12. As such a comparison is made between the indicated reading shown on the meter 23 and the meter 27 the end 16 acts as a reference and eliminates the effects of any variations in the intensity of light from bulb 28. If, for instance, the intensity of the light from bulb 28 is increased the indicated reading on both meters 23, 27 will be simultaneously increased to the position shown in the drawing and when the difference in these two meters is then read this difference will be a representation of a true increase in composition and/or specific gravity measurement of the fluid being measured. If, on the other hand, the intensity of the light bulb is decreased from that of its 12 o'clock pointer position the indicated reading on both meters will be moved in a counterclockwise direction and their different positions will also indicate a true representative of the change in the composition and/or specific gravity of the fluid that has taken place.

The drawing also shows an enclosure 38 which is used for the purpose of eliminating any stray light from an external source and any foreign matter from being deposited on the peripheral wall 18 of the guide 12.

In operation, bulb 28 is energized to radiate light at the peripheral side wall 18 of guide 12. Substantially equal amounts of light are directed towards each end 14 and 16 of the guide. The fluid to be analyzed is circulated through chamber 29 by passing into the chamber through inlet 33 and out of the chamber through outlet 34. The thermopiles 20 and 24 will measure the amount of light exiting from ends 14 and 16, respectively, and these measured amounts of light will be recorded by the meters 23 and 27, respectively. By comparing the readings of the meters 23 and 27, the fluid passing through chamber 29 is analyzed to determine its specific gravity and/or its composition.

From the aforementioned description it will be noted that an apparatus is disclosed which is useful in measuring the specific gravity and/or composition of a fluid and that such an apparatus is comprised of a radiant energy source, a single light guide, and two detectors, wherein the physical basis of this meter is the dependence of loss from the light guide on the refractive index and absorption coefficient of the medium surrounding it.

Fig. 2 of the drawing shows a modified form of an analyzing apparatus **10*a* from that which is disclosed in Fig. 1. The parts identified by reference numerals 20—23 and 29—34 which are shown in Fig. 2 are identical to the parts having these same reference numerals that are shown in Fig. 1. The length of the guide 12*a* between its end portions 14*a* and 16*a* as shown in Fig. 2 may be shorter than the length of the guide 12** as shown in Fig. 1 for reasons which will be hereinafter described.

Fig. 2 also shows an enclosure **38*a* which is smaller than the enclosure 38 shown in Fig. 1 but which is used for the same purpose as that already described for this latter mentioned enclosure. The radiant energy source shown representing the emitter 28*a* in Figure 2 represents any radiant energy source which is of a constant intensity such as, for example, constant light generating source rather than one which often varies in intensity as is the case with the radiant energy source 28 which is shown in Fig. 1. Since the light source disclosed in Fig. 2 is one which is of constant intensity no comparison need be made between the light that is exiting from the opposite ends 14*a* and 16*a* of the guide 12*a* that is shown in this Figure 2. In other words, the right end 16*a* of the guide 12*a*** shown in Fig. 2 need not be extended to the right so it can act as a reference source from which light leaving this end of the guide can be compared with light leaving the left end of the guide so that a change in the intensity of the light source would not introduce an error in the measurement of the fluid being measured in this manner as was the case in Fig. 1 arrangement that has already been described.

From the aforementioned description of Fig. 2, it will be noted that an apparatus is disclosed which is useful in measuring the specific gravity and/or composition of a fluid and that such an apparatus is comprised of a radiant energy source which is of a constant intensity, a single light guide and a detector wherein the physical basis of this analyzing apparatus is the dependence of loss from the light guide on the refractive index and absorption coefficient of the mediums surrounding it.

Fig. 3 of the drawing shows still another modified form of the analyzing apparatus **10*b* which is similar to that which is disclosed in Fig. 1. Although the thermopile 20, 24 are the only parts shown within the enclosures 38*b* it should be noted that all of the other elements that are shown within the confines of the enclosure 38 in Fig. 1, although not shown in Fig. 3, are also contained within the enclosure 38 of Fig. 3. These elements include such parts as the light guide 12, the chamber 29 and the radiant energy source 28** shown in Fig. 1.

In the Fig. 1 arrangement, conductors 21, 22 of the thermopile 20 at one end of the analyzing apparatus are connected to meter 23 and another set of conductors 25, 26 of the thermopile 24, at the other end of the analyzing apparatus, are connected to another meter 27. However, the Fig. 3 arrangement differs from this Fig. 1 arrangement in that conductors **21*b*, 22*b* for the thermopile 20 and the conductors 25*b* and 26*b* for the thermopile 24 are both connected to a null balanced indicator 40**.

With an arrangement such as that shown in Fig. 3 an operator can adjust the null balance indicator 40 by initially setting the knob 42 to a position in which the pointer 44 will always point to a selected null position of the zero mark on the indicator scale 46 when the liquid whose specific gravity and/or composition that is being measured reaches a pre-selected desired value. Should the measured value of the liquid exceed this pre-selected value the pointer 44 will move in a clockwise fashion away from the aforementioned null position to a position such as is indicated by reference numeral **44*a*. This latter pointer position will indicate to the operator the degree to which the liquid passing through the chamber 29 has exceeded the aforementioned desired null or zero indicating scale value when he observes the distance to which the pointer has moved upscale. In a similar but opposite manner it can readily be seen that should the aforementioned measured value of the liquid drop below this pre-selected null value the pointer 44 will move in a counter-clockwise fashion away from the aforementioned zero or null position to some downscale position such as is indicated by reference numeral 44*b*. This latter pointer position will indicate to the operator the degree to which the specific gravity and/or composition if the liquid passing through the chamber 29** has dropped below the aforementioned desired null value.

From the aforementioned description of Fig. 3 it will be noted that an apparatus is disclosed which is useful in measuring the specific gravity and/or composition of a liquid and that such an apparatus is comprised of a radiant energy source, a single light guide and two detectors that are shown in the form of a thermopile that are connected to a null indicator. The physical basis of this analyzing apparatus is, as was noted supra, the dependence of loss from the light guide on the refractive index and absorption coefficient of the medium surrounding it.

Fig. 4 of the drawing shows still another modified form of apparatus **10*c*. Except for the movable type of radiant energy source 28*c* and its associated indicator 64 and indicating scale 66 the remaining parts that are shown in Fig. 4 within the enclosure 38 are identical to the parts that have already been described which are within the enclosure 38** of Fig. 1.

Furthermore, the thermopile 20 within the enclosure 38 in Fig. 4 is shown connected to a meter **23*c* by way of a conductor 21, 22 and the thermopile 24 therein is connected to a meter 27*c* by way of a conductor 25, 26 in an identical manner to that shown for the conductors 21, 22 that connect the thermopile 20 to meter 23 and a conductor 25, 26 that connects thermopile 24 to the meter 27 as shown in Fig. 1. The meter 23*c* operates in a manner similar to that of meter 23** shown in Fig. 1 in that its pointer will be moved from its twelve o'clock position in a clockwise direction to the right into the dotted line position such as the position 23*a* as the output voltage of the thermopile is increased due to a decrease in the specific gravity and/or composition of the fluid surrounding the guide 12 in chamber 29. Movement of the pointer 23*d* on the other hand will be in a counter-clockwise direction to the left of its twelve o'clock position toward a dotted line position such as the position 23*f* when the output current of the thermopile is decreased due to an increase in specific gravity and/or composition of the fluid surrounding the guide 12 in chamber 29.

The meter 27*c* as shown in Fig. 4 operates in a manner similar to that of meter 27 shown in Fig. 1 in that its pointer 27*d* will be moved clockwise to the right from its twelve o'clock position into a dotted line position such as the position 27*e* when any increase in the intensity of the radiant energy source 28*c* takes place. In a similar but opposite manner the pointer 27*d* will be moved counter-clockwise from its twelve o'clock position into the dotted line position 27*f* when any decrease in the intensity of the radiant energy source 28*c* takes place.

One way of measuring the composition and/or specific gravity of a fluid passing through the chamber 29 shown in Fig. 4 is to thus note the difference between the intensity of the radiant energy passing from the left end 14 of the guide 12 and the intensity of the radiant energy passing from the right end 16 of this guide. This is done by observing the difference in position to which the pointer 23*d* has moved to the right or left of its twelve o'clock position as compared to the position to which the pointer 27*d* has moved to the right or left of its twelve o'clock position. The difference between these two readings will thus represent the specific gravity and/or composition of the fluid that is passing through the chamber 29 in a manner similar to that already described supra under the description of Fig. 1.

In addition to the aforementioned parts which Fig. 4 arrangement has in common with the parts disclosed in Fig. 1 arrangement it should be noted that the meter 23*c* is provided with two conductors 48, 50 which are used to transmit the variations in voltage which meter 23*c* receives from thermopile 20 to a null indicating instrument 52. Fig. 4 also shows a second pair of conductors 54, 56 which are used to transmit the variations in current which meter 27*c* receives from thermopile 24 to the null indicating instrument 52. The null indicating instrument 52 may be of any one of a number of well-known commercially available types.

By rotating the knob 58 of such a null indicating instrument, a null or zero indicating position for this instrument can be established so that when the pointer 60 is caused to move to the twelve o'clock position by the differences in voltage that it receives through the conductors 48 and 50 and the conductors 54, 56 then this pointer position will represent a specific composition and/or a specific gravity value of the fluid which an operator of this apparatus desires to have present in the chamber 29. If the aforementioned desired composition and/or specific gravity value of the fluid in chamber 29 has been reached the mechanical linkage 62 connecting a balancing motor of this null indicating instrument with a movable light source 28*c* will have then positioned the indicator 64 of such a light source in its zero scale indicating position, or in other words, in a light indicator 64 position on scale 66 which is indicative to the operator that the desired composition and/or specific gravity of the fluid in the container 29 has been reached.

After a null or desired composition and/or specific gravity point has been established and the composition and/or specific gravity of the fluid within the chamber 29 is decreased, the difference in voltage being transmitted by way of conductors 48, 50 and 54, 56 to the null indicating instrument 52 will be increased. The difference sensed by the null indicating instrument 52 in this manner will cause the pointer 60 to move in a counter-clockwise direction to the dotted pointer position shown as 60*a* and also set its balancing motor in operation to return the pointer to its zero null indicating position 60. As this latter balancing motor action takes place it will cause a mechanical linkage 62 to move the movable light source 28*c* to a position such as represented by the dotted pointer position 64*a*. This last mentioned position of the light source 28*c* will indicate to the operator the value to which the composition and/or the specific gravity of the fluid in the chamber 29 has dropped below the desired composition and/or specific gravity that is desired for this fluid.

If, on the other hand, the aforementioned composition and/or specific gravity of the fluid within the chamber 29 is increased the difference in voltage being transmitted by way of conductor 48, 50 and 54, 56 to the null indicating instrument 52 will be increased. The difference sensed by the null indicating instrument 52 will then cause its pointer to move in a clockwise direction to the dotted pointer position shown as 60*b* and sets its balancing motor in operation to return the pointer to its zero or null indicating position. As the latter balancing motor action takes place it will cause the mechanical linkage 62 to move the movable light source 28*c* to a position such as is represented by the dotted pointer position 64*b*.

The last mentioned position of the light source will indicate to the operator the value of the composition and/or specific gravity to which the fluid in the chamber 29 has increased above the desired composition and/or specific gravity value referred to supra.

Although no specific details are shown in the drawing at the light source end of the linkage 62 it should be understood that a conventional rotary motion to reciprocal motion converting mechanism could be used. While not shown such a mechanism might well consist of a rotatable pinion mounted on the light end of linkage 62 which is in mesh with a slidably mounted rack that is fixed to the light source 28*c*. Such a mechanism could be used to move the light source in either of the directions indicated by the arrows 68 or 70 shown in Fig. 4 of the drawing.

From the aforementioned description of Fig. 4 it will be noted that an apparatus is disclosed which is useful in measuring the specific gravity and/or composition of a fluid and that such an apparatus is comprised of a movable radiant energy source which may or may not be of a constant intensity, a single light guide and a detector wherein the physical basis of this analyzing apparatus is the dependence of loss from the light guide on the refractive index and absorption coefficient of the medium surrounding it.

What is claimed is:

1. Means for analyzing fluids, comprising an elongated member through which light can be transmitted, said member having first and second ends and a peripheral side wall extending between said ends, a light source to emit radiant energy directly against a selected outer peripheral side wall portion of said member and cause the light to be transmitted through the member to its first and second ends, a jacket to retain a fluid to be analyzed in contact with another peripheral side wall portion of said member, light responsive means for measuring the light passing out of each of said ends of said member and wherein said difference in the two measurements provide an accurate measurement of the index of refraction of said fluid.

2. Means for analyzing fluids, comprising a transparent rod having two ends and peripheral side wall, a lamp bulb disposed in a plane that is normal to the longitudinal axis of said rod and between the ends of said rod to directly illuminate an external portion of the peripheral side wall of said rod, a jacket surrounding said rod and disposed between said illuminating portion and one end of said rod, said jacket being operably connected with said rod to retain fluids to be analyzed in contact with a portion of said peripheral side wall, a thermopile disposed at each end of said rod for measuring the light passing therethrough and wherein said difference in the thermopile measurements provide an accurate measurement of the index of refraction of said fluids.

3. Means for analyzing fluids, comprising a transparent rod having two ends and a peripheral side wall, a lamp bulb disposed in a plane that is normal to the longitudinal axis of said rod and between the ends of said rod to directly illuminate an external portion of the peripheral side wall of said rod, a jacket surrounding said rod and disposed between the bulb and one end of said rod, said jacket being operably connected with said rod to retain fluids to be analyzed in contact with a portion of said peripheral side wall, said jacket having an inlet and an outlet to permit circulation of fluids to be analyzed to continuously pass therethrough, a thermopile disposed at each end of said rod for measuring the light passing out of each of said ends of said rod wherein the difference in thermopile measurements provide an accurate measurement of the index of refraction of said fluid.

4. Means for analyzing fluids comprising an elongated radiant energy conducting member having first and second ends and a peripheral side wall, a radiant energy emitting means to immediately direct light at an outer peripheral side wall of said member, means for retaining fluids to be analyzed in contact with a portion of said peripheral side wall, a radiant energy responsive means for measuring the difference in light passing out of the ends of said member to thereby provide an accurate measurement of the index of refraction of said fluids.

References Cited in the file of this patent

UNITED STATES PATENTS

| | | |
|---|---|---|
| 2,569,127 | Eltenton | Sept. 25, 1951 |
| 2,790,081 | Munday | Apr. 23, 1957 |
| 2,794,924 | Skarstrom | June 4, 1957 |